(No Model.) 5 Sheets—Sheet 2.
J. GRAHAM.
MACHINE FOR MOLDING PLASTIC MATERIALS.
No. 592,908. Patented Nov. 2, 1897.
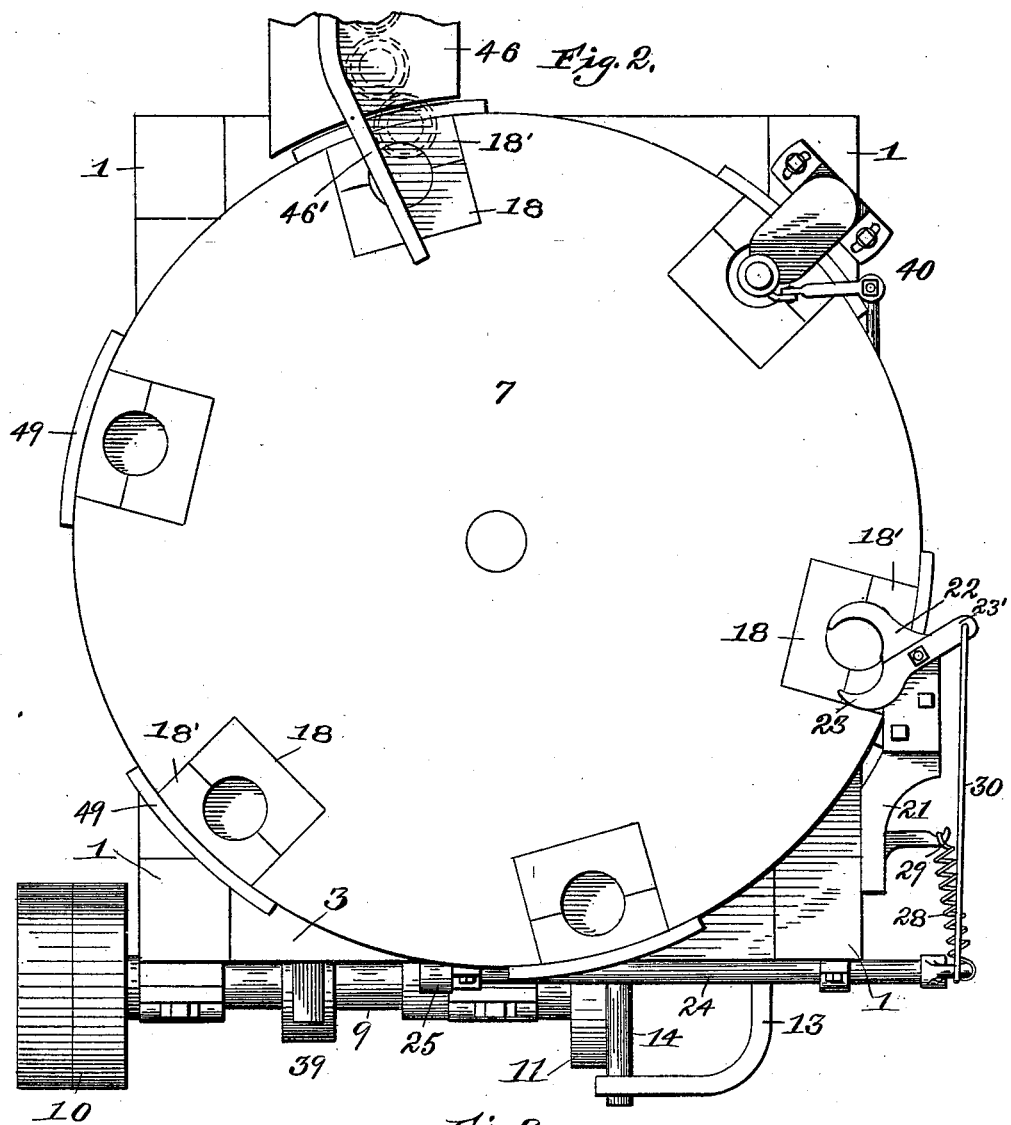
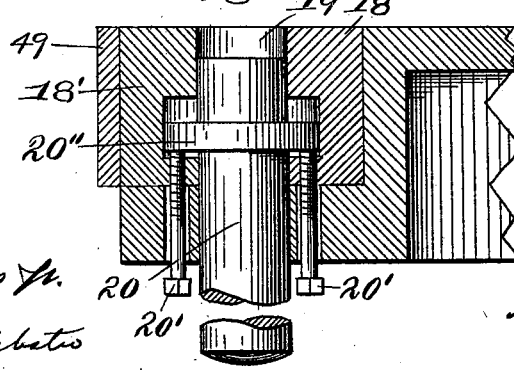

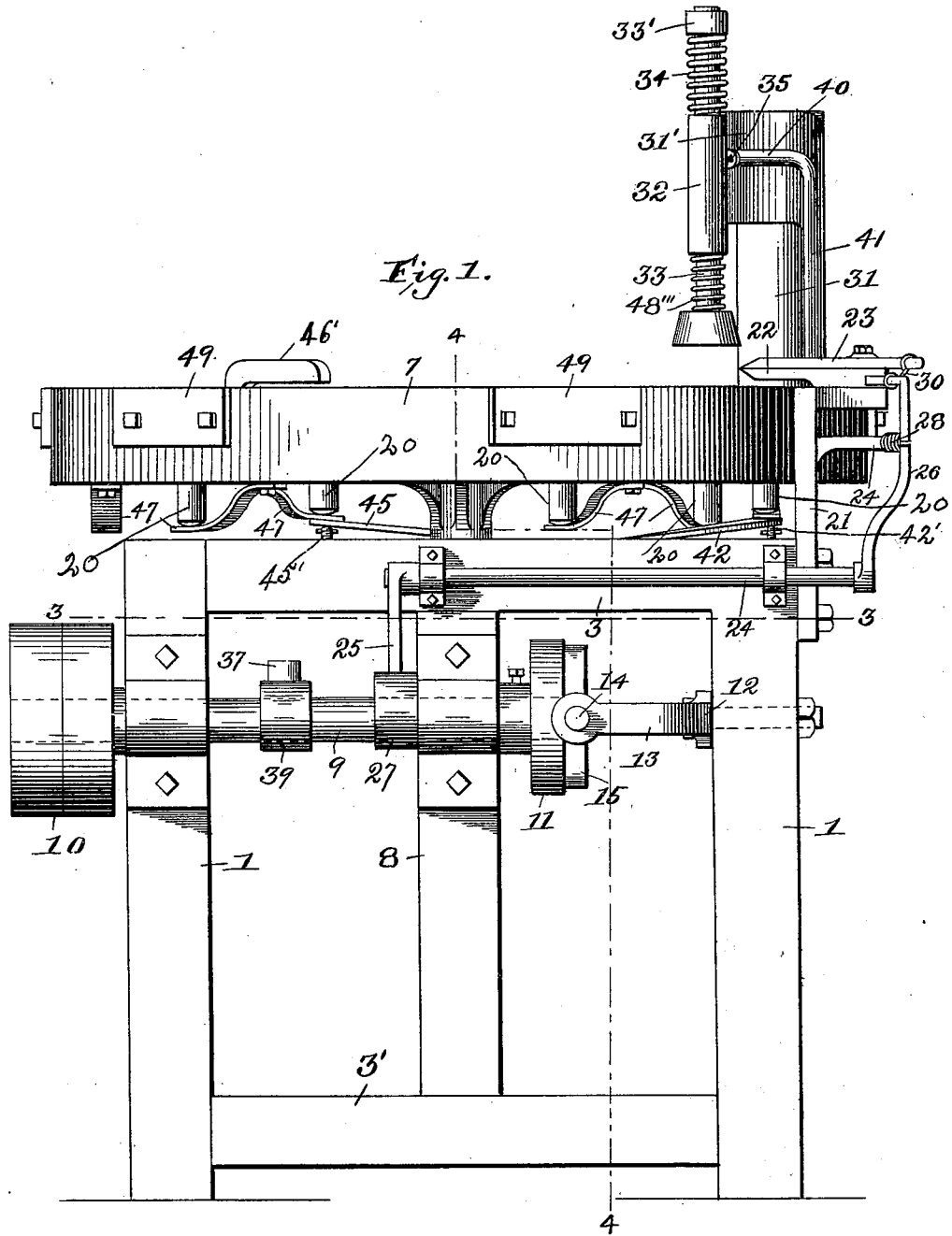

(No Model.)  5 Sheets—Sheet 3.
J. GRAHAM.
MACHINE FOR MOLDING PLASTIC MATERIALS.
No. 592,908. Patented Nov. 2, 1897.
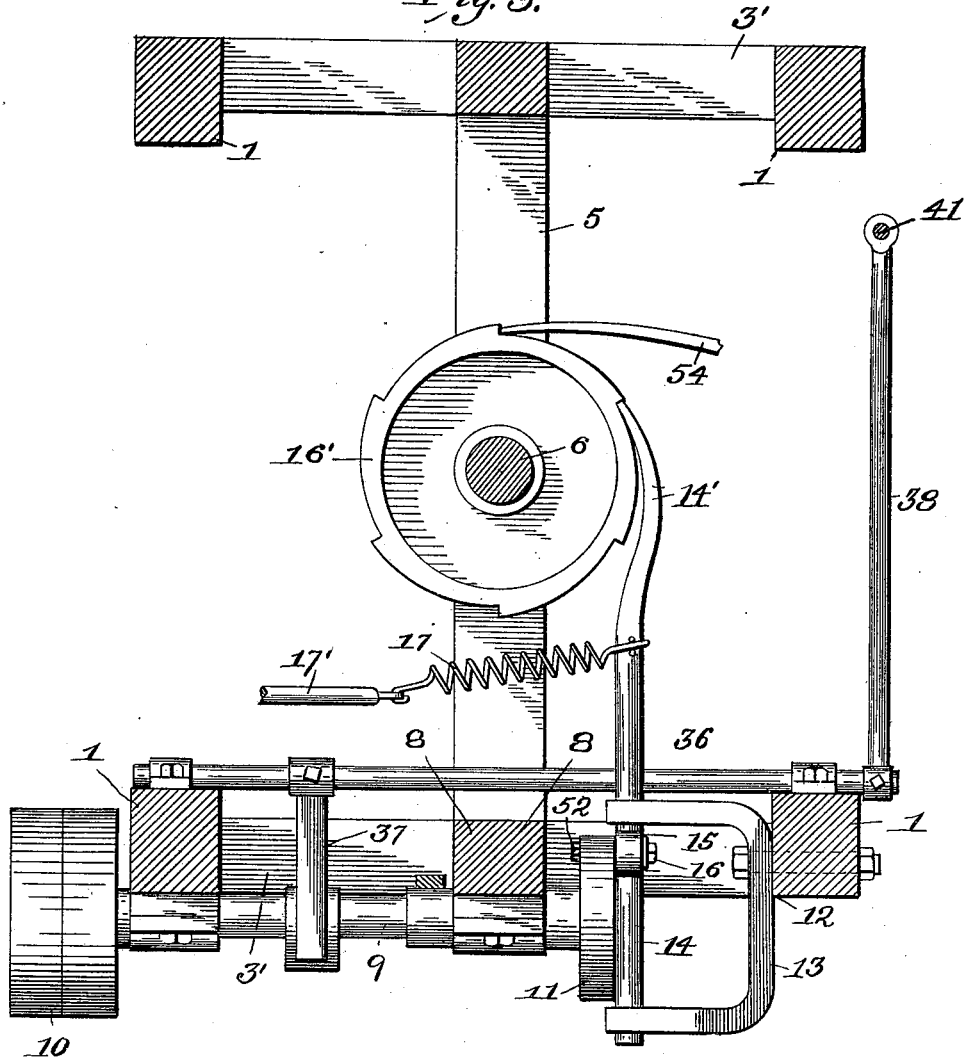
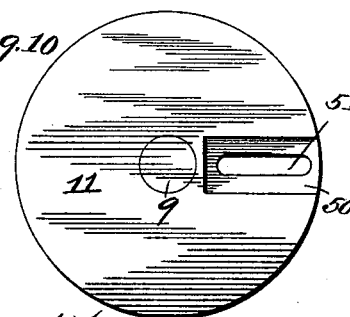
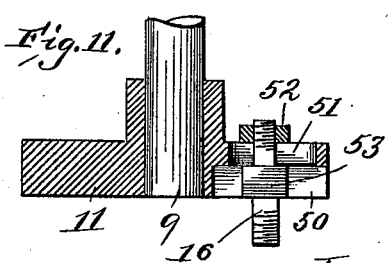
Witnesses
Wm H. Edwards Jr.
Carroll J. Webster
Inventor
James Graham
by Charles E. Adamson
Atty.

(No Model.) 5 Sheets—Sheet 4.
J. GRAHAM.
MACHINE FOR MOLDING PLASTIC MATERIALS.
No. 592,908. Patented Nov. 2, 1897.
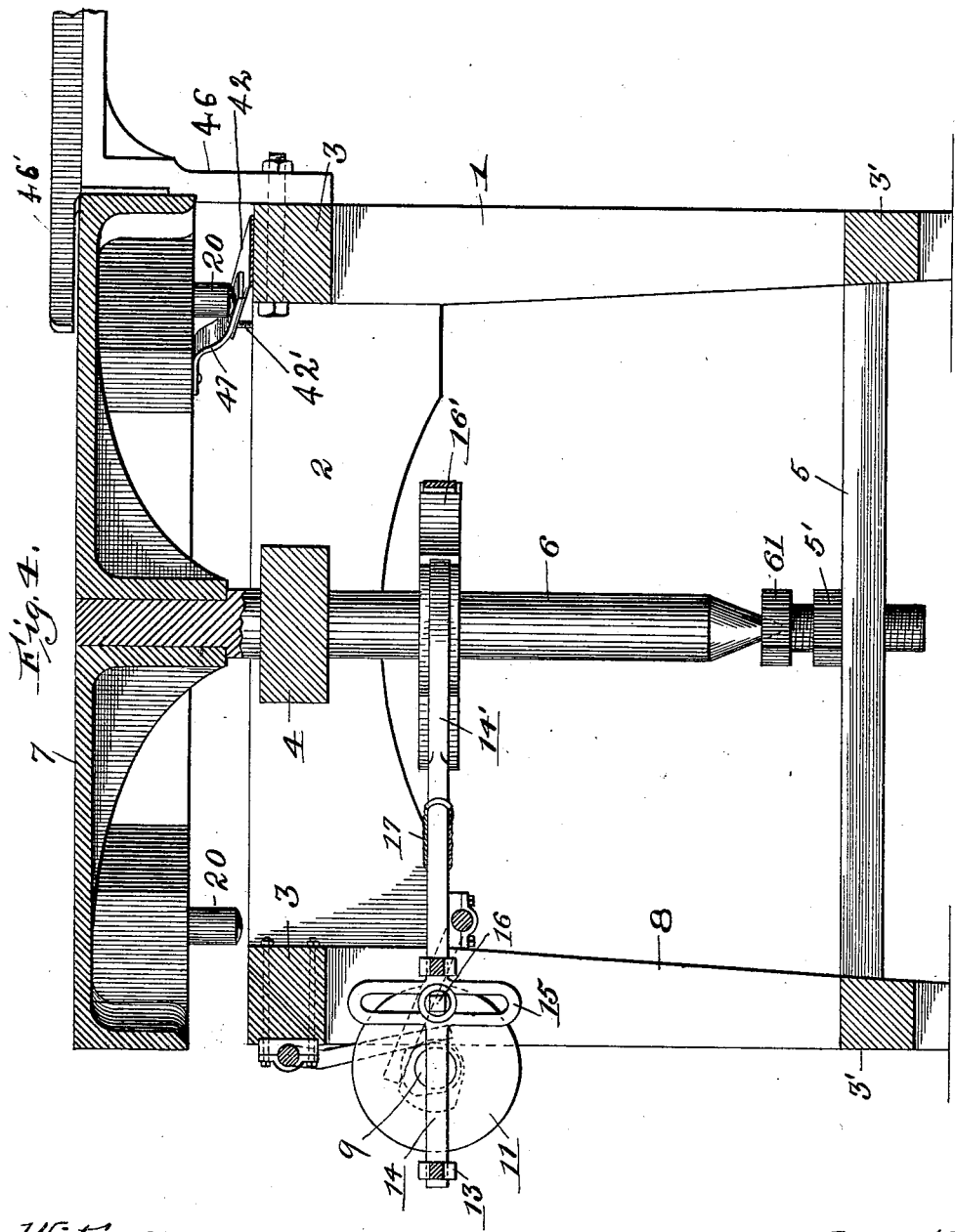

(No Model.) 5 Sheets—Sheet 5.
J. GRAHAM.
MACHINE FOR MOLDING PLASTIC MATERIALS.
No. 592,908. Patented Nov. 2, 1897.
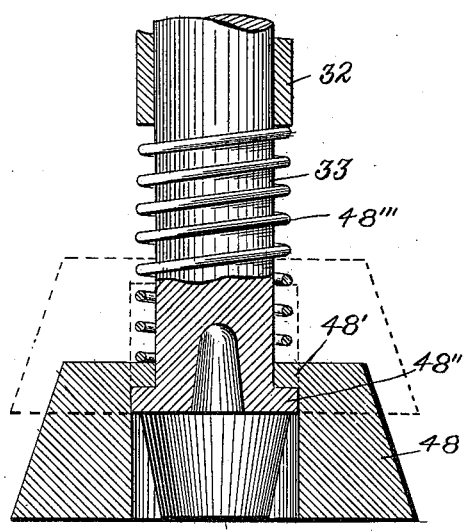
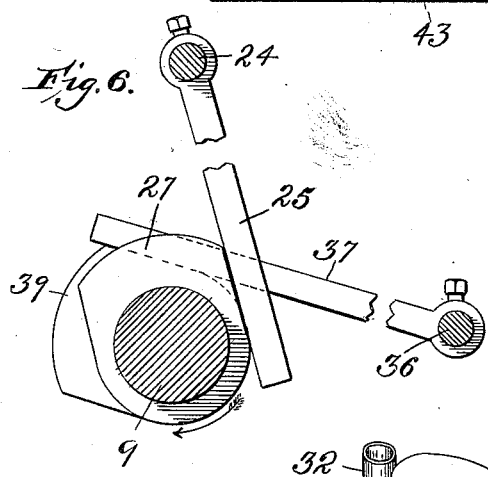
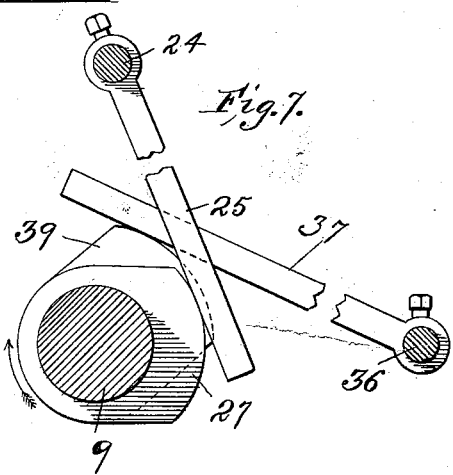
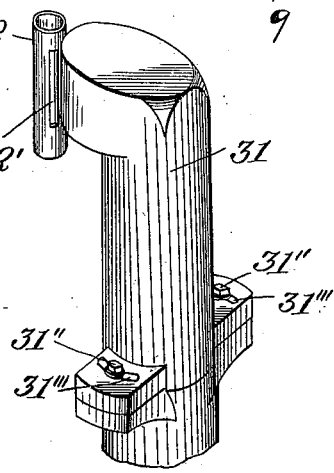
Witnesses
Wm H. Edwards Jr.
Carroll J. Webster
Inventor
James Graham
by Charles E. Adamson
Atty.

UNITED STATES PATENT OFFICE.

JAMES GRAHAM, OF MUNCIE, INDIANA, ASSIGNOR, BY DIRECT AND MESNE ASSIGNMENTS, OF TWO-THIRDS TO ALBERT E. COUNT AND ALBERT A. AULT, OF SAME PLACE.

MACHINE FOR MOLDING PLASTIC MATERIALS.

SPECIFICATION forming part of Letters Patent No. 592,908, dated November 2, 1897.

Application filed May 26, 1897. Serial No. 638,233. (No model.)

*To all whom it may concern:*

Be it known that I, JAMES GRAHAM, a citizen of the United States, residing at Muncie, in the county of Delaware and State of Indiana, have invented certain new and useful Improvements in Machines for Molding Plastic Articles; and I do hereby declare the following to be a full, clear, and exact description of the invention, such as will enable others skilled in art to which it appertains to make and use the same.

My invention relates to a machine for molding plastic articles, such as glass tumblers, paper-weights, inkstands, and other similar articles of glass or of any other plastic material.

The objects of the invention are to provide a revolving table carrying a plurality of molds and automatic mechanism for severing the molten glass in proper quantities and depositing the same in the molds, which progressively position beneath the cutting apparatus, and a molding mechanism which projects downwardly into the mold alternately with the movement of the table to form the article, which is automatically raised from the table and moved therefrom onto a stationary table in a finished state. These objects are obtained by an automatic mechanism which consists in the parts as hereinafter shown, described, and claimed.

While my invention is applicable to molding articles from any plastic or molten material, in the accompanying drawings I have illustrated the principle as especially adapted to the molding of articles of glassware.

In the drawings, Figure 1 is a side elevation of a complete machine constructed and arranged in accordance with my invention. Fig. 2 is a plan view of the same. Fig. 3 is a sectional plan view taken at a point indicated by the lines 3 3, Fig. 1. Fig. 4 is a transverse sectional view of the machine, taken at a point indicated by the line 4 4, Fig. 1. Fig. 5 is a detail view, partly in section, of a plunger. Fig. 6 is a sectional elevation of the power-shaft, illustrating more particularly the arrangement of the cam and levers for actuating the cutter and plunger. Fig. 7 is a like view illustrating the parts in their operative position. Fig. 8 is a detail view of the standard which supports and guides the plunger. Fig. 9 is a detail sectional view of a portion of the table, this view being taken through one of the molds and illustrating the construction and arrangement thereof. Fig. 10 is an elevation of the disk, through the medium of which reciprocatory motion is applied to the pawl for revolving the table. Fig. 11 is a sectional detail view of the same, taken at a point 11 11, Fig. 10.

In carrying out my invention I employ a frame consisting of the legs 1 and suitable side cross-pieces 2 and 3, respectively, the cross-pieces 2 being connected by a cross-piece 4 and the legs 1 1 upon each side being connected by the cross-pieces 3' 3', arranged in parallel relation to the cross-pieces 3 3, the cross-pieces 3' 3' being connected by a central cross-piece 5, which extends at right angles to the cross-piece 4. The cross-pieces 4 and 5 serve as a support and bearing for a vertical shaft 6, which carries upon its upper end a table 7.

Connecting the cross-pieces 3 and 3' upon one side of the machine is a vertical standard 8, and journaled in bearings upon one of the legs 1 and the standard 8 is the power-shaft 9. Motion is imparted to the power-shaft through the medium of the band-pulleys 10, there being the usual fast and loose pulley employed, and arranged upon the opposite end of the shaft is a disk 11. Secured to one of the legs at 12 is a yoke 13, the ends of the yoke being provided with orifices in which the outer end of a pawl 14 is secured and guided. Pawl 14 is provided near one end and between the arms of the yoke 13 with a vertical slotted enlargement 15, through the slot of which passes a bolt 16, carried by the disk 11. By this means rotary motion of the disk transmits a reciprocatory movement to the pawl, the pawl being guided in its movement by the arms of the yoke 13. The inner end 14' of the pawl is formed of a spring metal and is normally held against a ratchet-wheel 16', arranged upon the vertical shaft 6, through the medium of a coiled spring 17, which connects the pawl with the stationary portion of the frame through the medium of a projection 17', secured to a member of the frame. By this means the reciprocatory movement of the pawl transmits an intermittent rotary movement to the table.

At intervals around the table corresponding to the number of teeth upon the ratchet-wheel 16' are recesses which form pockets of a size to receive and house the molds. The molds comprise two sections 18 and 18', each section having a central semi-orifice upon one side, which, when the molds are in position within the aperture in the table, form a vertical orifice 19, in which is guided an ejector 20, the table also being provided with an orifice in alinement with the orifice formed by the molds through which the lower end of the ejector projects. Secured to the frame is a casting 21, which provides a support for the cutter or shears which comprise the lower shear member 22, which is secured to the casting 21 and stationary therewith and of a length to project over the table in vertical alinement with the orifice and the pivoted shear member 23, which has a movement over the stationary member, the opposite end 23' projecting at some length beyond the pivotal point thereof. Journaled in bearings upon one of the cross-pieces 3 is a shaft 24, one end carrying a downwardly-projecting arm 25, the opposite end carrying an upwardly-projecting arm 26. Arm 25 projects in the path of travel of a cam 27, arranged upon the power-shaft 9, and is normally held against the cam by means of a coiled spring 28, connecting the arm 26 and a projection 29 upon the casting 21. Connecting the upper end of the arm 26 and the outer end of the pivoted shear member 23 is a link 30, whereby when the power-shaft is revolved the shear member 23 is intermittently moved across the shear member 22.

Projecting upwardly from the frame is a standard 31, which is provided with an inwardly-projecting head 31', to which is secured a casing 32, in which is secured and guided the plunger 33. The plunger is normally held in a raised position through the medium of a coiled spring 34, interposed between the casing 32 and a collar 33' upon the plunger, the upward movement of the plunger being determined by means of a projection 35, which projects through a slot 32' in the casing 32.

Journaled in bearings secured upon the inside of two of the legs 1 is a rock-shaft 36, which carries intermediate its length an arm 37 and upon its outer end an arm 38, the arms 37 and 38 projecting in opposite directions from the shaft. Secured upon the power-shaft 9 is a cam 39, against which normally bears the arm 37, whereby when the power-shaft 9 is revolved an intermittent movement is imparted to the arm 37 and consequently the arm 38. Secured to the lug 35 upon the plunger is an arm 40, and connecting the outer end of the arm 40 and the arm 38 is a rod 41, whereby as the arm 38 is moved intermittent vertical movement is imparted to the plunger 33. By referring to Figs. 6 and 7 it will be seen that the cams 27 and 39 are so positioned upon the power-shaft 9 that they operate simultaneously to move the arms 25 and 37, respectively, and to rock the shafts 24 and 36 to which they are secured. Therefore the shears and plunger operate simultaneously.

By reference to Fig. 4 it will be seen that the cams and the connection for the pawl 14 are so positioned that they operate alternately, whereby when the table is being moved the shear and plunger are not in operation and consequently when the shear and plunger are in operation the table is stationary.

The operation is as follows: The power-shaft being revolved the table intermittently revolves and remains stationary and the shears and plunger alternate with the movement of the table. When it is desired to form an article, the mold-sections having the contour of the article desired are placed in the orifices in the table, the ejector being properly adjusted by means of the screws 20', which screw through the mold and bear against a collar 20'' upon the ejector. The object of adjusting the ejector by means of the screw 20' is to determine the form and configuration of the molded article. It will be noticed that when the table revolves the lower end of the ejector moves in the path of travel of the inclined guideway 42, which is located under the shears. This inclined guideway is adjusted by means of the set-screw 42'. The operator, after gathering a sufficient amount of the molten glass, places the same upon the ejector between the shears. The ejector has been raised a sufficient distance by means of the guideway 42, so that only a sufficient amount (enough to fill the mold when the ejector is raised) is severed by the shears to form the required article. At this point of the operation the pawl 14 operates upon one of the teeth of the ratchet-wheel 16, with the result that the table is revolved to cause the mold with the required amount of molten glass to revolve and position directly beneath the plunger 33. The ejector has at this point of the operation passed over the adjustable guideway 42 and is in a lowered position. Consequently when the plunger lowers it carries therewith the male member 43 of the mold, and the molten glass is formed into the desired article. The plunger is now raised and the table partially revolved, as before described. Secured to the frame at a point beyond the plunger is an inclined adjustable guideway 45 similar to the guideway 42, which is in the path of the lower end of the ejector, which is raised thereby and forces the molded article to a point above and flush with the table. This guideway 45 is adjusted by means of the set-screw 45'.

46 designates a stationary table, the upper surface of which is flush with the upper surface of the table 7 and is provided with a projecting arm which projects over the revolving table, the arm having an inclination with reference to the axle of the revolving table to cause the molded articles to be automatically carried upon the stationary table as the table 7 revolves. In order to aline the plunger laterally with the standard 31, the standard is formed of two parts secured together by the bolts 31'', which pass through radial slots 31''' in one of the sections, whereby the upper section of the standard may be partially revolved and the plunger which projects over the table be moved laterally into proper alinement with the mold.

In order to adjust the table vertically in reference to the plunger, the vertical shaft 6, which carries the table, is journaled at its lower end in a bearing-nut 6', the lower end of the shaft being tapered and having a bearing in a correspondingly-shaped orifice in the bearing-nut. The bearing-nut has an integral screw-threaded projection which screws into the cross-piece 5 and is thereby adjusted vertically in relation thereto, a jam-nut 5' locking the screw in its set position.

The lower ends of the ejectors 20 bear against a flexible friction-plate 47, which will ride over the guideways 42 and 45 and allow the ejectors to rise easily and prevent all lateral movement.

By referring to Fig. 5 it will be seen that the plunger 43 is provided with a cover 48, which is provided with a shoulder 48', which bears against a shoulder 48'' on the plunger-rod. This cover is normally held down by means of the coiled spring 48''', which bears against the casing 32 and the top of the cover. When the plunger is forced into the mold, the cover lies on top of the table and will take the position shown in dotted lines in Fig. 5.

The object of forming the plunger with a cover is to keep the molten glass in the mold when the plunger is forced therein, thereby making a smooth upper edge on the molded article.

49 designates plates on the edge of the table for holding the mold-sections in position.

The disk 11 is provided with a slot 50, as shown in Figs. 10 and 11, and the smaller slot 51 in the rear of the slot 50, through which passes the pin 16. Through the medium of the slots the pin can be adjusted to vary the length of the movement of the pawl. The pin is held in place by means of the nut 52. The pin is also provided with the enlargement 53, which works in the slot. The ratchet 16' is prevented from moving backward by means of the spring 54, which is secured to a member of the frame.

While I have shown but one means of carrying out my invention, I am aware that I should not be limited to this particular means, and am also aware that I can make many minor changes in the construction and arrangement of parts without in the least departing from the nature and principles of my invention.

Having thus described my invention, what I claim as new, and desire to secure by Letters Patent, is—

1. In a glass-molding machine, the combination with a supporting-frame, of a rotatable table supported on the frame carrying the mold, shears supported on the frame above the table, a plunger on the frame adapted to be passed into the mold and means for alternately rotating the table with the movement of the shears and plunger, substantially as described.

2. In a glass-molding machine, the combination with a supporting-frame, of a rotatable table supported on the frame carrying the mold, shears above the table, a plunger adapted to be passed into the mold, and means for intermittently rotating the table, and simultaneously actuating the shears and plunger, the movement of the table alternating with the movement of the shears and plunger, substantially as described.

3. In a glass-molding machine, the combination with a supporting-frame, of a rotatable table supported on the frame carrying the mold, shears above the table, a plunger adapted to be passed into the mold, a power-shaft journaled on the frame, and means connecting the power-shaft with the rotatable table and the power-shaft with the shears and with the plunger, whereby when the power-shaft is actuated the table will be rotated alternately with the movement of the shears and plunger, substantially as described.

4. In a glass-molding machine, the combination with a supporting-frame, of a rotatable table supported on the frame carrying the mold, shears above the table, a plunger adapted to be passed into the mold, a power-shaft journaled on the frame, mechanism connecting the power-shaft with the table, cams on the shaft, and mechanisms arranged in the path of the cams connected to the shears and plunger for actuating the shears and plunger alternately with the movement of the table, substantially as described.

5. In a glass-molding machine, the combination with a supporting-frame, of a shaft on the frame, a table on the shaft carrying the mold, a ratchet on the shaft, shears above the table, a plunger adapted to be passed into the mold, a power-shaft journaled on the frame, a pawl connecting the power-shaft with the ratchet for rotating the table, and mechanism connecting the power-shaft with the shears and plunger for actuating the shears and plunger alternately with the movement of the table, substantially as described.

6. In a glass-molding machine, the combination with a supporting-frame, of a rotatable shaft on the frame, a table on the shaft carrying the mold, a ratchet on the shaft, shears above the table, a plunger adapted to be passed into the mold, a power-shaft journaled on the frame, a disk on the shaft, a pawl engaging the ratchet and provided with a slotted enlargement, a pin on the disk passing through the enlargement, a yoke pivoted to the frame and connected slidingly to the pawl, and mechanism connecting the power-shaft with the shears and plunger for actuating the shears and plunger alternately with the movement of the table, substantially as described.

7. In a glass-molding machine, the combination with a supporting-frame, of a rotatable table supported on the frame carrying the mold, shears above the table, a plunger adapted to be passed into the mold, a power-shaft journaled on the frame, mechanism connecting the power-shaft with the rotatable table and the power-shaft with the shears and plunger, whereby when the power-shaft is actuated the table will be rotated alternately with the movement of the shears and plunger, and means for locking the movement of the table, when the shears and plunger are being actuated, substantially as described.

8. In a glass-molding machine, the combination with a supporting-frame, of a rotatable table supported on the frame carrying the mold, shears supported on the frame above the table, a plunger on the frame adapted to be passed into the mold, mechanism for alternately rotating the table with the movement of the shears and plunger, and means for vertically adjusting the table on the frame, substantially as described.

9. In a glass-molding machine, the combination with a movable table carrying the mold and plunger adapted to be passed into the mold, of an ejector forming the base of the mold, and means for raising the ejector after the plunger has been withdrawn and upon the movement of the table for ejecting the finished article from the mold, substantially as described.

10. In a glass-molding machine, the combination with a movable table carrying the mold and plunger adapted to be passed into the mold, of an ejector forming the base of the mold, a device for vertically adjusting the ejector in the mold, and means for raising the ejector after the plunger has been withdrawn and upon the movement of the table for ejecting the finished article, substantially as described.

11. In a glass-molding machine, the combination with a movable table carrying a two-part mold forming a recess with an enlargement in the recess, of an ejector forming the base of the mold, a shoulder on the ejector within the enlargement of the recess, and a set-screw bearing against the shoulder for vertically adjusting the ejector in the mold, substantially as described.

12. In a glass-molding machine, the combination with a supporting-frame, of a movable table supported on the frame carrying the mold, a plunger adapted to be passed into the mold, an ejector forming the base of the mold and projecting below the table, and a projection on the table in the path of the ejector for raising the ejector after the plunger has been withdrawn and upon the movement of the table, substantially as described.

13. In a glass-molding machine, the combination with a supporting-frame, of a movable table supported on the frame carrying the mold, shears supported above the table, a movable base for the mold extending below the table and a projection on the frame in the path of the base for raising the base of the mold when the mold is beneath the shears, substantially as described.

14. In a glass-molding machine the combination with a supporting-frame, of a movable table supported on the frame carrying the mold, shears supported above the table, a movable base for the mold extending below the table and adjustable means on the frame in the path of the base for raising the base of the mold when the mold is beneath the shears, substantially as described.

15. In a glass-molding machine, the combination with a supporting-frame, of a movable table supported on the frame carrying the mold, an ejector in the mold forming the base and extending below the table, a flexible friction-plate carried by the table against which the lower end of the ejector bears, and an inclined guideway on the frame arranged in the path of the ejector for raising the ejector when the table is moved, substantially as described.

16. In a glass-molding machine, the combination with a supporting-frame, of a rotatable table supported on the frame, a series of molds on the table, a plunger above the table, shears above the table, the molds so positioned on the table that one mold will be under the shears and one under the plunger, an ejector forming a movable base for the molds, and a projection on the frame in the path of the ejector for raising the same after the plunger has been withdrawn from the mold and upon the movement of the table, substantially as described.

17. In a glass-molding machine, the combination with a supporting-frame, of a rotatable table supported on the frame, a series of molds on the table, a plunger above the table, shears above the table, the molds so positioned on the table that one mold will be under the shears and one under the plunger, an ejector forming a movable base for the molds, a stationary table adjacent the rotatable table, an arm extending from the stationary table over the rotatable table, and projections on the frame adjacent the shears and arm and arranged in the path of the ejector for raising the same when the molds are beneath the shears and before reaching the arm, substantially as described.

18. In a glass-molding machine, the combination with a supporting-frame, of a movable table supported on the frame carrying the mold, means for separating the molten material from the gather when placed in the mold, a plunger on the frame adapted to be passed into the mold and means for alternately moving the table with the movement of the separating means and plunger, substantially as described.

19. In a glass-molding machine, the combination with a movable table carrying the mold, a standard, a plunger supported on the standard and adapted to be passed into the mold, a cover for the end of the plunger adapted to rest on the top of the table when the plunger is forced into the mold, a spring having one end bearing against the cover and the opposite end bearing against the standard for returning the cover to its normal position when the plunger is withdrawn, and a spring bearing against a projection on the top of the plunger and the standard for withdrawing the plunger from the mold, substantially as described.

20. In a glass-molding machine, the combination with a movable table carrying the mold, of a plunger adapted to be forced into the mold, a two-part standard for supporting the plunger, and means for adjusting the upper portion of the standard to properly aline the plunger in relation to the mold, substantially as described.

21. In a glass-molding machine, the combination with a supporting-frame, of a rotatable shaft on the frame, a table on the shaft, a series of molds on the table, a plunger above the table, shears above the table, the molds so positioned on the table that one mold will be under the shears and one under the plunger, a ratchet on the shaft having a number of teeth corresponding to the number of molds, a power-shaft on the frame, a pawl connecting the power-shaft with the ratchet, and mechanism connecting the shears with the power-shaft and the plunger with the power-shaft for alternately actuating the shears and plunger and actuating the ratchet, substantially as described.

In testimony whereof I affix my signature in presence of two witnesses.

JAMES GRAHAM.

Witnesses:
ALBERT E. COUNT,
JAMES L. HIATT.